United States Patent [19]

Vassileff

[11] Patent Number: 4,804,688

[45] Date of Patent: * Feb. 14, 1989

[54] OPEN-CELL FOAMED GYPSUM INSULATION

[76] Inventor: Neiko I. Vassileff, 1440 Midland Ave., Bronxville, N.Y. 10701

[*] Notice: The portion of the term of this patent subsequent to Sep. 16, 2003 has been disclaimed.

[21] Appl. No.: 93,372

[22] Filed: Sep. 4, 1987

Related U.S. Application Data

[63] Continuation-in-part of Ser. No. 907,000, Sep. 12, 1986, Pat. No. 4,724,242, which is a continuation-in-part of Ser. No. 715,116, Mar. 22, 1985, Pat. No. 4,612,333.

[51] Int. Cl.$^4$ ............................................. C08Q 18/14
[52] U.S. Cl. ........................................ 521/64; 521/65; 521/68; 521/83; 521/100; 524/2; 524/423; 524/650
[58] Field of Search ............... 521/64, 65, 68, 83, 521/100; 524/2, 423, 650

[56] References Cited

U.S. PATENT DOCUMENTS

| | | | |
|---|---|---|---|
| 2,902,998 | 9/1959 | Durandeaux | 131/331 |
| 3,525,685 | 9/1970 | Foster et al. | 106/87 |
| 3,563,777 | 2/1971 | Pratt et al. | 106/88 |
| 3,719,513 | 3/1973 | Bragg et al. | 106/109 |
| 3,758,319 | 9/1973 | Ergesse | 106/88 |
| 3,839,059 | 10/1974 | Rothfelder et al. | 106/109 |
| 3,926,650 | 12/1975 | Lange et al. | 106/88 |
| 3,974,024 | 8/1976 | Yamo et al. | 106/88 |
| 4,084,980 | 4/1978 | Motoki | 106/87 |
| 4,133,638 | 1/1979 | Healey | 422/32 |
| 4,229,223 | 10/1980 | Flake | 106/88 |
| 4,240,839 | 12/1980 | Crespeau et al. | 106/88 |
| 4,265,964 | 5/1981 | Burkhart | 521/55 |

*Primary Examiner*—Maurice J. Welsh
*Attorney, Agent, or Firm*—Lackenbach Siegel Marzullo & Aronson

[57] ABSTRACT

An aqueous slurry of gypsum plaster is stabilized by an organic, polymeric, hydrophilic stabilizer for more than 30 days without setting.

Upon activation with a Lewis acid the slurry becomes hydrated. The plaster form or the hydrated form may be employed to impregnate a substrate to form insulating sheeting. The substrate may be fabric, felt, paper, nonwoven, or sponge.

Open-cell, foamed gypsum may be used alone or molded to shaped articles such as bricks for a firewall.

21 Claims, 2 Drawing Sheets

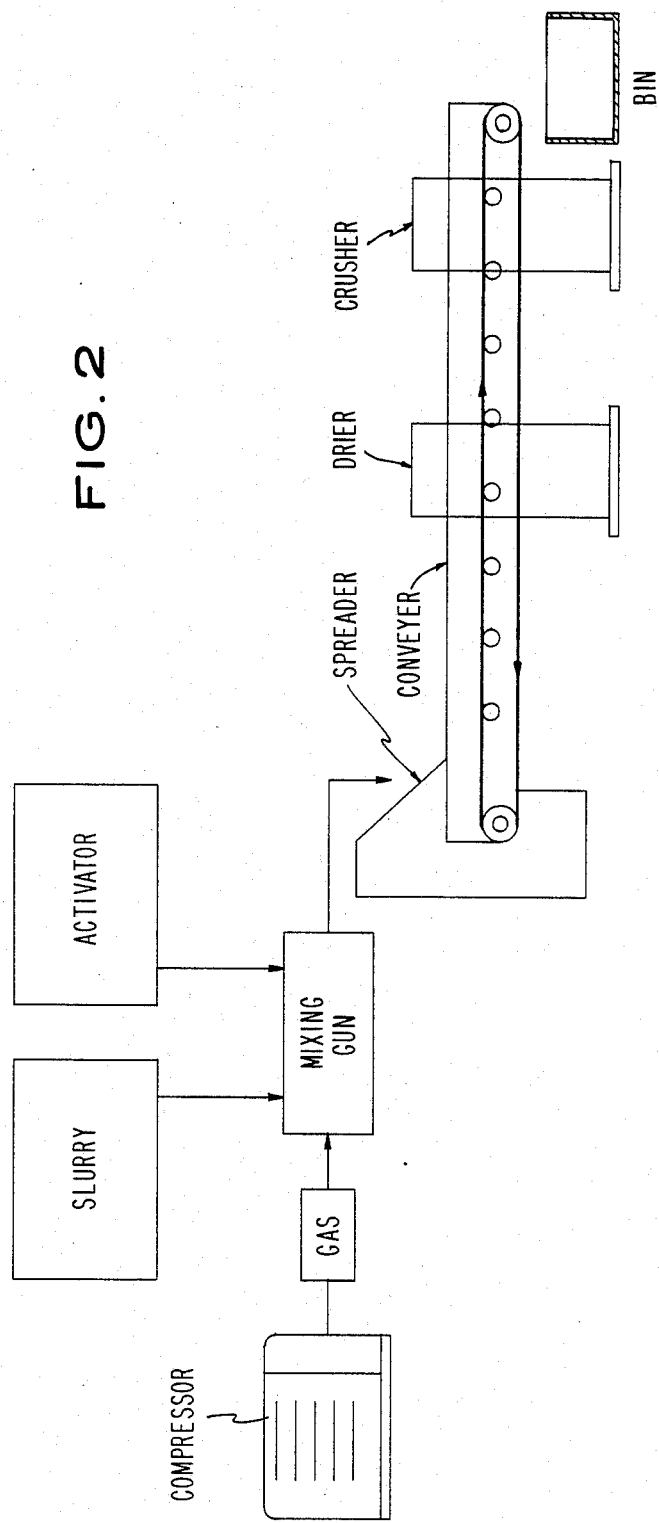

OPEN-CELL FOAMED GYPSUM INSULATION

RELATED U.S. APPLICATIONS

This application is a continuation-in-part of Ser. No. 907,000 filed on Sept. 12, 1986, now U.S. Pat. No. 4,724,242, which in turn is a continuation-in-part of Ser. No. 715,116 filed Mar. 22, 1985, now U.S. Pat. No. 4,612,333 issued Sept. 16, 1986.

FIELD OF THE INVENTION

This invention relates to the production, storage, and use of a plaster gypsum slurry to produce an open-cell foamed gypsum composition useful for insulation in the construction industry and for making fire walls.

BACKGROUND AND DISCUSSION OF THE PRIOR ART

Plaster, also known as plaster-of-paris, calcined gypsum or gypsum plaster, is generally assumed to be a form of calcium sulfate hemihydrate, $CaSO_4 \cdot \frac{1}{2}H_2O$. Gypsum is generally assumed to be calcium sulfate dihydrate, $CaSO_4 \cdot 2H_2O$. The process of wetting plaster and its transformation to gypsum is known as setting. Concrete, which contains plaster, also is known to set. Gypsum cements may also be used or mixed with plasters; these cements have an intermediate amount of hydration.

Before this invention the setting time of plaster to concrete could be controlled only in the short term, from about three minutes to about 20 hours, as disclosed in U.S. Gypsum Co. brochure "What Gypsum Plaster Can Do for You", revised Aug. 1983. Such short setting times and such inability to extend them obviates the continuous use of plaster slurries in industrial processing, obviates transportation of slurries from place to place, and drastically curtails impregnation of woven or nonwoven substrates.

Closed-cell gypsum compositions for use as a thermal insulation material are disclosed in U.S. Pat. Nos. 4,240,839 and 4,161,855, but these products are closed cell, do not disclose long setting times, nor impregnation of woven textiles or nonwoven felts to make flexible gypsum material. Other patents disclosing closed-cell gypsum and short setting times for application in the field of insulation are the following patents:

| U.S. Pat. No. | Inventors |
| --- | --- |
| 1,722,648 | Upson |
| 1,798,609 | Knowlton |
| 2,593,008 | Chappell |
| 2,556,031 | Dickey et al |
| 2,602,759 | Mollo |
| 2,664,406 | Armstrong |
| 2,731,377 | Riddell et al |
| 2,862,829 | Dixon et al |
| 2,902,998 | Durondeaux |
| 2,913,346 | Hoffman |
| 2,915,301 | Selden |
| 2,921,862 | Sucetti |
| 2,979,415 | Taylor |
| 3,526,685 | Foster |
| 3,563,777 | Pratt et al |
| 3,719,513 | Bragg et al |
| 3,758,319 | Ergene |
| 3,839,059 | Rothfelder et al |
| 3,926,650 | Lange et al |
| 3,974,024 | Yano |
| 4,084,980 | Motoki |
| 4,133,638 | Healey |
| 4,229,223 | Flake |
| 4,265,964 | Burkhart |

In addition to closed-cell gypsum many other materials have been employed as insulating material in residential housing such as fiberglass, rock-wool, foamed polystyrene, polyurethane foam, and urea-formaldehyde cellulosic composites. The last three named organics suffer from having inappropriate fire wall, flame propagation, and smoke generating characteristics even though they may have suitable thermal insulating properties.

Furthermore, although the inventors here are aware of polyamideimide and asbestos fabric material for use as fire cloths, protective clothing, and the like, hitherto there has been no satisfactory method for manufacturing on a continuous basis lightweight, foamed gypsum fabrics.

OBJECTS OF THE INVENTION

It is an object of this invention to provide a stable plaster slurry with a long enough setting time to impregnate fabrics or felts, to transport long distances, or to make into open-cell, foamed, molded objects.

It is a further object of this invention to make molded foam adaptable to filling air spaces in conventional building joists and studding in order to insulate the structure and make fire walls.

It is yet another object of this invention to provide lightweight fabrics with good insulating properties, poor flame propagation properties, and low smoke generating qualities.

It is still another object of this invention to provide open-cell bricks suitable for building fire walls.

It is another object to provide an insulating material comprising composite fibers, nonwoven felts, or woven fabrics.

Still another object is to provide a versatile thermal insulation composition made from inexpensive raw material, easily available, and capable of processing into bricks, solid composites with studs, joists, ceilings, floors, roofs, walls, and the like, or into flexible sheets, tapes, papers, or blankets.

Other objects will be apparent to those skilled in the art.

SUMMARY OF THE INVENTION

Surprisingly, the objects above are met by adding a water-soluble, organic, polymeric stabilizer to an aqueous slurry of gypsum plaster, calcium sulfate hemihydrate, so that the setting time of the slurry can be as long as two years. Preferably this stabilized slurry contains a surface-active agent. The preferred range of compositions for the stabilized slurry is in weight percent:

| Component | Wgt Percent |
| --- | --- |
| Calcium sulfate hemihydrate | 40–85 |
| Water | 15–60 |
| Water-soluble, organic polymer | 0.1–10 |
| Surface active agent | 0–5 |

The stabilized slurry may be foamed by the addition of an aqueous stream preferably containing an acidic activator (Lewis acid) such as alum or aluminum sulfate, a surface-active agent/detergent, and a gas, preferably air. Other foaming gases may be carbon dioxide, nitrogen, argon, or halofluorocarbons.

Optionally, the open-cell foam may be constituted in the presence of a flexibilizing and strengthening third stream comprising an aqueous, polymeric latex such as standard GR-S rubber (a copolymer of butadiene and styrene), or an acrylic latex, or a polyurethane.

Impregnated textiles or nonwoven felts or papers are made by first dipping them in the stable slurry until the desired "loading" is achieved and then at leisure setting the insulating sheet or other shaped article into a permanent foam by treating the composite with the acidic activator, which causes the calcium sulfate to set within a few minutes.

Bricks, fire walls, or other shaped articles are formed by filling a suitable mold with the activated foamed slurry (optionally strengthened with another polymer or latex). In the case of residential or commercial construction, either new or already finished, the activated foam may be injected through plugs or openings in wall spaces, ceiling and floor joists, or any other enclosed finished or unfinished construction. Fire walls may be constructed by injection into enclosed spaces or by masonry employing preformed bricks of the open-cell foamed gypsum material. A superior stucco can also be made. Dry powder may have various uses such as covering landfill.

Figure 1:
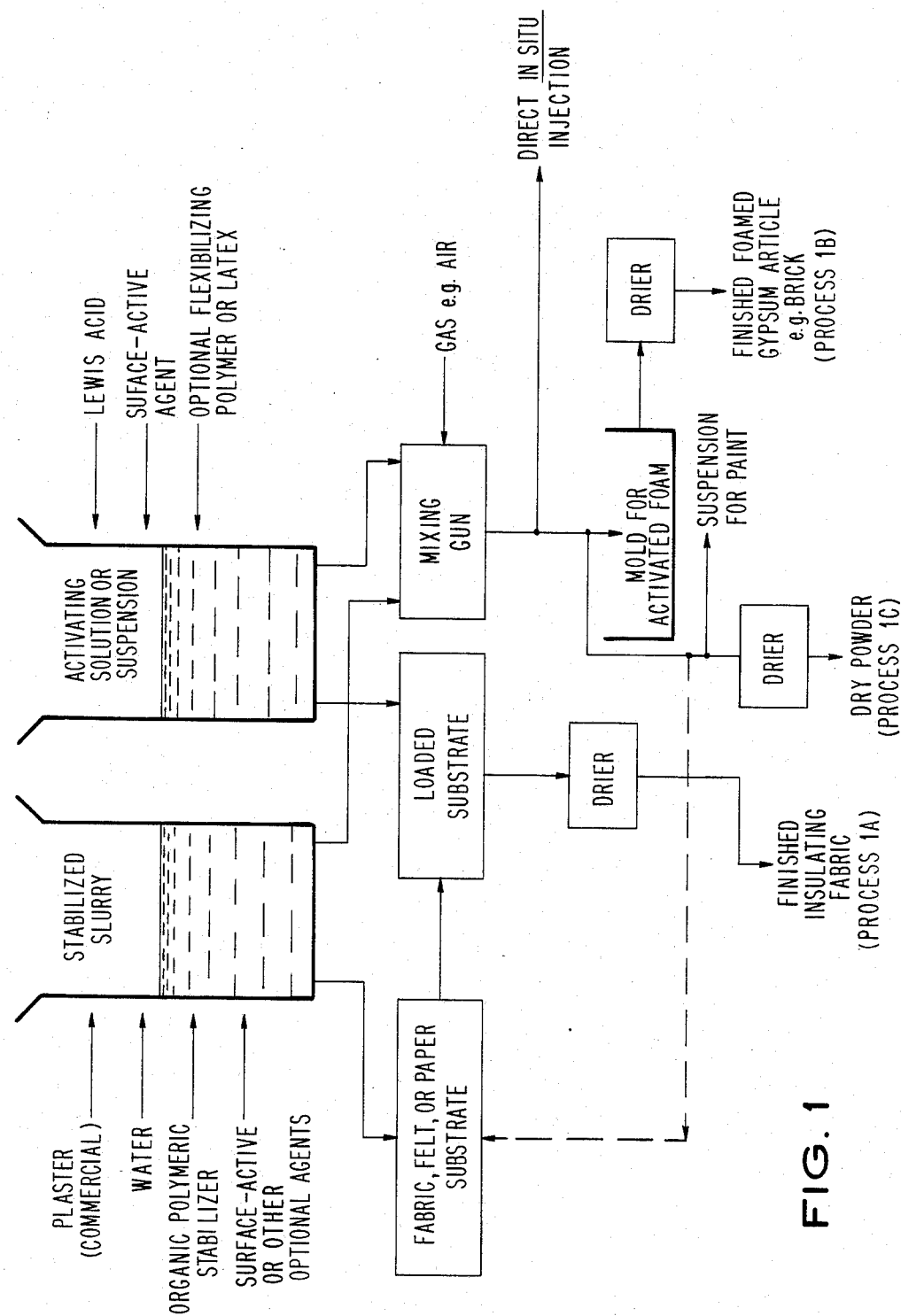
FIG. 1 shows diagrammatically routes for making five different embodiments of the invention.

Process 1a is a flow diagram for making fabric, felt, or paper impregnated with stable plaster gypsum which can be set at will to make finished insulating fabric.

Process 1b is a flow diagram for a process for making open-cell, foamed, molded articles.

Process 1c diagrams a route for making dried, open-cell, foamed powder.

FIG. 2 shows a detailed embodiment of the process diagrammed in Process 1c.

DESCRIPTION OF THE PREFERRED EMBODIMENTS

As diagrammed in Process 1a, the stabilized slurry, which is the essence of the invention, has several components. "Pure" commercial gypsum plaster has from about 92 percent to about 96 percent calcium sulfate. Gypsum plaster is available in over 30 grades and types with varying properties due principally to differences in crystal size and shape.

Metal casting plaster has a density of 41 lbs/ft$^3$, because it also contains sand and refractories; while gypsum cement can have a density of 127 lbs/ft$^3$. Impression dental plaster has a VICAT setting time of 3.5-5 minutes, while some industrial plasters (e.g. AIR-TROL-E, U.S. Gypsum, Chicago IL 60606) have setting times of seven hours. That company's brochure states that setting times up to about one day are known.

Minimum compressive strength can vary from 150 psi for a flame resistant plaster coating or 1,800 psi for pottery plaster to 13,500 psi for the dense gypsum cement cited above.

The various uses and grades of plaster can require from 20-40 parts of water per 100 parts of gypsum cement to 75 parts water for 100 parts of industrial plaster to 140 parts water for 100 parts of metal casting plaster. All of these types of molding, gauging, art, casting, pottery, dental, and various grades of gypsum cements are suitable for use in this invention. The preferred type of gypsum plaster is industrial gauging plaster which requires 62 parts water per 100 parts plaster has a setting time of about one-half hours, has a minimum dry compressive strength of 2,400 psi, a dry density of 75 lbs/ft$^3$, and 0.22 percent maximum expansion on setting. The amount of plaster in the slurry of this invention can vary from about 40 to about 85 weight percent, from about 50 to 70 weight percent is preferred, and from about 55 to about 60 weight percent is most preferred.

The water used to make the stabilized plaster slurry is of no particular quality. It can be raw water, filtered and treated urban water, or deionized water. The amount can range from about 15 to 60 weight percent, with about 30 to about 50 weight percent preferred and from about 40 to about 45 weight percent most preferred.

The organic, polymeric stabilizer is the third required component in the slurry, the additional ingredients being optional. The preferred stabilizers are highly hydrophilic, while the most preferred polymeric stabilizers are water-soluble, especially those containing carboxylic moieties.

Suitable water-soluble polymers for use as the stabilizer in amounts from about 0.1 to about 10 weight percent of the total slurry are carboxymethylcellulose, methylcellulose, hydroxyethylcellulose, hydroxypropylcellulose, polyethylene oxide, polypropylene oxide, polyvinyl pyrrolidone, polyethyleneimine, polyacrylic acid and its soluble salts, polyacrylamide, hydrolyzed polyacrylonitrile, polyvinyl alcohol, polyvinyl methyl ether, salts of polymethacrylic acid, starch, material and synthetic starch derivatives, molasses, acrylic acid-maleic anhydride or acid copolymers, copolymers of all the above, and the like. The preferred water-soluble polymer for stabilizing the suspension are salts of polyacrylic acid.

Surprisingly, slightly or mildly crosslinked water-sensitive polymers such as those of crosslinked polyacrylic acid (e.g. Carbopol TM polymers, BF Goodrich Chemical Co., Cleveland, OH 44131) are also effective as stabilizers.

The slurries comprising a gypsum plaster, water, an organic, polymeric, hydrophilic stabilizer, and optionally other agents are stable, that is workable and nonsetting for days, weeks, months, or years, a phenomenon hitherto unreported in the prior art.

There are several optional additives for the stabilized slurries of the present invention.

A surface-active agent may optionally be added to the stabilized slurry, as diagrammed in FIG. 1. This agent may be anionic, cationic, or nonionic. A representative anionic surface-active agent is the family of sulfosuccinates, such as sodium laurylsulfosuccinate. A typical cationic type of agent is the family of trimethylbenzalkonium chloride, or the aliphatic cetyldimethylethylammonium bromide. Nonionic detergents are exemplified by ethoxylated aromatics such as alkylarylpolyether alcohols, isooctylphenoxypolyethoxylethanol, or even 2,6,8-trimethyl-4-heptanol. Soaps, of course, are also surface-active agents as exemplified by potassium oleate. The preferred amount of such agent is from about zero up to about five percent.

Another optional additive for the stabilized slurry is an adhering agent for increasing the bonding between the slurry and an impregnated fabric, felt, sponge, or paper, or between the slurry and a wooden stud, metal lathe, a ceiling, or floor. Surprisingly, it has been found that active hydrogen compounds, when added to the stabilized slurry, increase adhesion to the typically polar surfaces of both residential and commercial construction. Sucrose sugar, aliphatic alcohols, amines, and carboxylic acids are examples of such active hydrogen compounds. Polymers such as polyethyleneimine or polyacrylic acid may also be employed. The preferred amount of adhesive agent is from about zero to about two percent by weight.

It is often useful to add an antioxidant to the stabilized slurry, especially for long term storage or transport. Setting times of over two years have been observed in preparing and testing the stabilized slurries of the present invention. For such long times an optional antioxidant, such as any of following conventional ones well-known to those skilled in the art may be added from about 10 to about 5,000 parts per million: hydroquinone monomethyl ether, mono-tertbutylhydroquinone, hydroquinone, p-benzoquinone, toluhydroquinone, 2,5-ditertiarybutyl hydroquinone, hydroquinone di(beta-hydroxyethyl) ether, and the like.

Chelating agents of the conventional types are optionally added to the stabilized slurry. Citric and tartaric acids are representative of the simple type of chelating agents. The family of ethylenedinitriletetraacetic acids, their salts, and their derivatives may be advantageously employed in amounts from about 0.01 to about 5 weight percent. Other families of chelating agents whose soluble salts may be useful are triethanolamine salts, N-hydroxyethyl ethylenediamine, nitrilotriacetic acid, N,N-di(2 hydroxyethyl) glycine, and the phosphonate types. Sodium salts are particularly favored.

For particular applications, other additives such as colorants, lubricants, metalizing agents, fibers, sands, inorganic fillers, thickeners, and other functional materials well-known to those skilled in the art of insulation and construction may be employed.

The setting times of the stabilized slurries of this invention are generally longer than 30 days. Oftentimes experimentation has shown stability of 60-, 90-, or 120-days or more, and one experimental sample has been stable for over two years.

Activation of the stabilized slurry is accomplished in a controllable fashion by the addition of an activator solution or suspension comprising a Lewis acid, a surface-active agent, optionally a flexibilizing/strengthening polymer or latex, and other optional agents.

A key ingredient in the activating solution or suspension is a Lewis acid. Generally, a Lewis acid is a compound which readily accepts electrons. Typical examples of Lewis acids are aluminum chloride, stannic chloride, boron trifluoride, ferric chloride, antimony pentachloride, and the like. It is possible to consider Brønsted acids, that is active-hydrogen compounds, within the broader definition of Lewis acids. The preferred Lewis acid activators for carrying out this invention are aluminum compounds, especially aluminum sulfate and alum. "Alum" is a trivial name for a variety of hydrations, compositions, and forms of a group of aluminum compounds, most often aluminum potassium sulfate.

Besides commencing setting of the stabilized slurry, the Lewis acid may have other functions which are not well understood. The acid may also catalyze formation of the flexibilizing/strengthening polymer, especially when that is a polyurethane. The Lewis acid may change the surface of the gypsum, change the pH of the slurry, or interact with an optional chelating agent. Without necessarily understanding the mechanism, it is known that the activator somehow causes setting of the stabilized slurry within about three to six minutes.

An ingredient useful in preparing a stable, uniform foam is a surface-active agent of the same description as given above as an optional ingredient in the stabilized slurry. Again a nonionic surface-active agent such as isooctylphenoxypolyethoxyethanol is preferred, available commercially as TRITON X-100 from Rohm and Haas Co., Phila., PA.

An important but optional ingredient in the activator solution or suspension is a hardening/flexibilizing/strengthening polymer, in suspension or latex form. This flexibilizing agent helps prevent the final gypsum product from being too brittle or from "dusting" too easily. The wide array of synthetic rubber, acrylic, styrene-containing, acrylonitrile-containing, polyvinyl chloride, or similar lattices are useful for this function. Adhesive-type lattices such as those of polyvinyl acetate may be employed. Yet another preferred type of hardening/flexibilizing/strengthening polymer is an in situ- type of polymeric urethane, made by adding a polyol to a diisocyanate in the presence of a weak acid. Normal "GR-S" synthetic rubber latex containing majority butadiene, minority styrene (Government Reserve - styrene) is preferred.

As shown in FIGS. 1 and 2, at least five different categories of product can be produced after mixing the stabilized slurry neat, or impregnated in another material, with the activating solution or suspension.

Process 1a shows the path in FIG. 1 for making finished insulating fabric, felt, paper, or other substrate containing the gypsum of the present invention. As shown in Process 1a the stabilized slurry alone first is employed to impregnate the substrate. The woven, nonwoven, felted, sponged, or paper substrate may be cellulose, cellulosic, cotton, flax, linen, cellulose derivative, regenerated cellulose, wool, silk, ramie, polyester, polyamide, acrylic, polycarbonate, polysulfone, polyamideimide, hydrocarbon polymer (e.g. polypropylene), polyphenolic, polyurethane, graphitic, other carbon fiber, asbestos, glass, nitride, or mixtures and copolymers thereof. The preferred substrates are natural cellulose paper, wool fabric, polyester woven fabric, acrylic felt, polyurethane sponge and polysulfone nonwoven material.

The "loaded" substrate, impregnated with the stabilized slurry, may be stored or shipped in bundle rolls or other forms, or alternatively used directly. It has been found that the slurry will be stabilized for at least 30 days, thus conveying that much flexibility to the operation. At the desired time activating solution or suspension is employed to wash, dip, spray, or treat the loaded substrate, thus causing the gypsum plaster to set to fully hydrated gypsum. After air drying at ambient conditions or accelerated drying in an oven or forced hot air drier, the finished insulated fabric, felt, nonwoven, sponge paper, or other substrate is really for its intended use.

The preferred medium for both stabilized slurry and activator solution is water, but in particular instances it may be preferable to add aliphatic alcohols, ketones, lower carboxylic esters, or acids to the aqueous systems to modify their solvent power. Normally approximately equal amounts of stabilized slurry and activator solution are used. In the final mixture of the two, the preferred amount of gypsum plaster or plaster/cement varies from 40 to 85 weight percent; most preferred is from about 55 to 65 weight percent. The preferred amount of water in the mixed streams is approximately 15 to 60 weight percent. The water-soluble, organic stabilizing polymer can range from about 0.1 to about 10 percent of the slurry; from about 3 to 6 weight percent is preferred. Whether added via the slurry or the activator, the preferred amount of surface-active agent is from about zero to about 5 weight percent, with from about 0.1 to about 2 weight percent more preferred.

Antioxidants, lubricants, chelating agents, adhesive agents or other optional additives preferably are added in amounts from about 0.01 to 1 weight percent each. The preferred amount of Lewis acid added to the activating solution is from about 2 to about 12 weight percent, more preferably about 4 to about 6 weight percent of the activator.

Process 1b diagrams the feeding of stabilized slurry, activating solution or suspension, and foaming gas simultaneously from three hose lines into a mixing gun, which produces within seconds a foam of gypsum. Process 1b shows this foam being poured into a mold for various shapes, e.g. bricks, followed by drying to make finished, foamed, molded articles.

Process 1c shows direct passage of foam into a drier for the production of loose, dry, set, foamed powder. Of course, the efflux from the mixing gun can be injected directly into a confined space such as a ceiling, floor, or wall area of residential or commercial construction to produce an insulating layer in situ. Furthermore, a wet suspension of set, hydrated gypsum may be employed to make an insulating paint, also shown in Process 1c.

FIG. 2 illustrates an elaboration of Process 1c. A compressor takes a gas to a pressure of about two to ten atmospheres, whereupon the pressurized gas (e.g. air) enters a mixing gun with the stabilized slurry and activator solution or suspension. Other gases such as argon, nitrogen, carbon dioxide, halocarbon, and the like may also be employed. The foam is led to the spreader section of a conveyor belt. After passage through a drying section and a crushing section the set, hydrated, gypsum powder is collected in a bin or other suitable container.

In a dotted line at the lower left of FIG. 1 an alternative route is shown for impregnating a fabric, nonwoven construction, paper, sponge, paper, or other substrate of the various materials exemplified above with a foam directly from the mixing gun. This alternative means that the activated foam will set in a normal time of a few minutes, normally three to five minutes. This may be advantageous for some substrates wherein the light density and high surface area of the foam could lead to a superior penetrability by a foam compared to a stabilized liquid slurry.

Having described some preferred embodiments of the present invention above, this invention is now illustrated by, but not limited by, some Examples. It is understood that the following Examples may be modified and extended in many ways yet still remain within the full scope of this invention described more fully in the Claims.

EXAMPLE 1

This Example illustrates preparation of the stabilized slurry of the invention.

A laboratory stirrer with a glass stirring rod is arranged to stir in a glass container. First 125 parts of ordinary, untreated tap water is added, followed by 100 parts U.S. Gypsum co. Champion-grade gauging plaster and one part sodium polyacrylate of 5000 molecular weight (Goodrich, Carboset TM). Optionally, 0.1 part nonionic surface-agent may be added (Rohm & Haas, TRITON X-100). The stirring is allowed to continue at about 60 cps until a smooth, stable dispersion is formed.

EXAMPLE 1A

Optionally 50 parts of a latex of polyvinyl acetate having 25 wgt percent solids may be gradually added during the 10-minute stirring (Borden Co.).

EXAMPLE 1B

This example illustrates the "shelf life" or stability of the slurry.

A 50-ml aliquot of the stabilized slurry as made in Example 1 containing the optional surface-active agent is poured into a 200-ml bottle, capped, and shaken for 20 seconds.

It is stored at ambient conditions and observed with shaking once a week. It is seen to be stable for up to two years.

EXAMPLE 2

This Example illustrates preparation of an activator solution employed in this invention.

One takes 150 parts water in a nonmetallic container, stirrer by a nonmetallic stirrer and adds 15 parts of Lewis acid, preferably aluminum sulfate, with continual stirring. After adding the Lewis acid, than one adds 8 parts surface-active agent, preferably nonionic TRITON X-100 (Rohm & Haas), and continues stirring until complete homogeneity is achieved.

EXAMPLE 3

This example illustrates the preparation of a foamed, molded article.

A stabilized slurry is prepared from 125 g. water, 100 g. gypsum gauging plaster, 1 g. sodium polyacrylate, and 25 g. latex of polyvinyl acetate, and shaken for 5-10 minutes, as in Example 1.

As in Example 2, 173 g. of activator solution is prepared.

Then in a glass or other nonmetallic vessel of at least five liters, but preferably 10 liters in size the two fluids are slowly mixed and stirred until homogeneity is achieved (about four minutes). Compressed air is introduced at 0.5 atmospheres for about three minutes, then the foam is poured into a rectangular mold, such as a bread pan. The full mold is then placed under an infrared lamp at a distance of about 0.25 meters to aid drying. After about 20 minutes of preliminary drying under the infrared lamp, the mold is put in an oven at about 90°-95° C. for 1-2 hours to evaporate excess water.

An open-cell, foamed brick results.

EXAMPLE 4

This example gives the method and results of characterizing a typical foamed gypsum product, as produced in Example 3.

Density

Various samples made by the procedure of Example 3 having slightly different proportions of ingredients, and slightly different foaming and drying conditions are measured for density by ASTM method D-1621. The preferred density ranges from about 1.5 to about 5 lbs/ft$^3$; the more preferred range is from about 2.5 to about 4 lbs/ft$^3$.

Thermal Conductivity

The insulation properties of the molded gypsum foam are measured by the procedure of ASTM C-177. Remembering that R insulating value equals 1/conductivity, the insulating value for this material was found to be 4.4 at 2° C. and 4.2 at 18° C. (R-value).

Water Vapor Transmission

A sample of foamed gypsum, as produced in Example 3, was subjected to the procedure of ASTM test C-355. The resulting water vapor transmission was 50 perms.

Fire Resistance or Fuel Contribution

Samples of the cured, open-cell, foamed gypsum as made in Example 3 were subjected to fire resistance and fuel contribution tests as specified in ASTM test E-119. The results for this gypsum product was zero.

Surface Burning Characteristics

ASTM tunnel test E84-81a is similar to UL-723, ANSI 2.5, NFPA 255, and UBC 42.1 tests for surface burning. Panels of material made by the procedure of Example 3 were subjected to this test at 73° 5° F. and relative humidity 50 5 percent. The results were flame spread index: zero
fuel contributed value: zero
smoke developed value: 5.

The foamed gypsum showed no ignition in 10 minutes, but there was slight charring, cracking, peeling, and flaking. There was no flamefront advancement, no afterflame, nor afterflow.

Formaldehyde Insulation Test

The U.S. Department of Housing and Urban Development has a standard test for formaldehyde generated by insulation. A sample of the product of this invention, as prepared in Example 3, was given this test. No formaldehyde was detected.

EXAMPLE 5

This example illustrates the continuous production of foamed gypsum from a mixing gun.

The mixing gun is powered by a RAPCO P-15 Mark III two-diaphragm, oil-balanced pump available from Rapperswill Corp., New York, N.Y. 10016. The parts of this pump in contact with the fluids are coated with polyvinyl chloride (PVC).

Three flexible lines of PVC or other comparatively inert tubing lead to the mixing gun. One has stabilized slurry, as prepared in Example 1; one has activator solution, as prepared in Example 2, and one has compressed air at a pressure of about ⅔ atmosphere (10 psi). The slurry rate and the activator rate are each adjusted to about 100 ml/minute. As the wet foam comes out of the mixing gun, it can be utilized in several ways:

EXAMPLE 5A

The wet foam generated in Example 5 is injected into any cavity of commercial or residential construction, where insulation is desired. This wet foam has a setting time of about three minutes before it will start to harden and become brittle. This wet foam has excellent wetting and adhesive properties for wood, metal, or concrete surfaces. For this use the presence of about 3 wgt percent sucrose or other adhesion improver in the slurry stream is advantageous.

EXAMPLE 5B

The wet foam generated in Example 5 is led to the spreading unit of a conveyor moving at about 1 meter/minute. As shown in FIG. 2, after 1 meter of travel it proceeds into a drier kept at about 90° C., which is about 1 meter long. After about 2 m of travel the conveyor takes the setting, drying foam through a crusher and finally to a storage bin. The contents of the bin may be further air-dried, or placed in an oven at about 90° C. for about 30 minutes.

EXAMPLE 5C

The wet foam generated in Example 5 can be employed to impregnate a textile substrate.

A bundle roll of 50 meters of nonwoven polyester 8 mm thick and 2 meters wide is placed on an axial support. This felted material is fed slowly through a vat at the rate of 1 meter per minute as the wet foam from Example 5 is spread on the material. The bundle roll is taken up on a rotating support in a chamber into which the excess wet foam drains. By this process the bundle roll is impregnated first in the spreading section and again for about a half-hour in the take-up section as the lower rotating half is continually bathed in the excess foam.

After the hour of immersion in the spreading section and the half-hour of bathing at the take-up vat, rotation is stopped, the bundle roll is raised and allowed to drain and air dry. Final setting takes place in a drier at 85° C. for an hour to produce a bundle roll of loaded material.

EXAMPLE 6

This example illustrates impregnation of a paper with stabilized slurry for later setting by an activator solution.

A bundle roll of polyacrylonitrile paper 1 mm thick, 50 meters long, and 2 meters wide is axially supported. At the rate of 2 m/minute this synthetic paper is led through an impregnating tray containing stabilized slurry, as prepared in Example 1. The impregnated paper is taken up on another axially supported bundle roll and allowed to drain for 30 minutes. The bundle roll is then dried in an oven for one hour at 90° C.

At any desired time or place, or immediately after draining without oven drying, the bundle roll of paper loaded with stabilized slurry may be activated by the same procedure as above employing activating solution or suspension, as prepared in Example 2.

In this fashion a finished insulating paper, felt, nonwoven fabric, or textile may be prepared impregnated with the gypsum powder of the present invention.

Although some specific embodiments of the invention have been described above, changes and modifications may be made in many ways by those skilled in the art while remaining inside the scope of this invention for which Letters Patent are sought, as claimed below:

I claim:

1. A composition for insulation comprising a plaster gypsum aqueous slurry and a polymeric stabilizer having a setting time greater than 30 days.

2. A composition for insulation as in claim 1, wherein the polymeric stabilizer is an organic, hydrophilic compound.

3. A composition for insulation as in claim 1, further comprising a surface-active agent.

4. A composition for insulation as in claim 3, wherein the weight percent composition is plaster gypsum from about 40 to about 85, water from about 15 to about 60, hydrophilic organic polymeric stabilizer from about 0.1 to about 10, and surface-active agent from about zero to about 5.

5. A composition for insulation comprising an open-cell foamed, hydrated gypsum, containing a polymeric stabilizer.

6. A composition for insulation as in claim 5 further comprising a composite material selected from the group consisting of chopped fiber, woven textile, nonwoven felt, paper, and foam sheeting.

7. A composition for insulation as in claim 6, wherein the composite material is selected from the group consisting of wool, silk, cotton, linen, flax, ramie, cellulose, cellulose derivatives, regenerated cellulose, polyester, polyamide, polyamideimide, acrylic, acrylonitrile, polyvinyl chloride, polyurethane, hydrocarbon polymer, graphite, nitride, asbestos, and mixtures and copolymers thereof.

8. A composition for insulation as in claim 3, wherein the surface-active agent is chosen from the group consisting of cationic, nonionic, and anionic and mixtures thereof.

9. A composition for insulation as in claim 1 further comprising at least one member of the group consisting of active-hydrogen adhesive promoters, antioxidants, chelating agents, colorants, lubricants, fibers, inorganic filters, and thickeners.

10. A composition as in claim 2, wherein the polymeric stabilizer has carboxylic groups and is selected from the group consisting of polyacrylic acid, hydrolyzed polyacrylonitrile, styrene-maleic copolymer, carboxymethylcellulose, and polymethacrylic acid, their salts and copolymers.

11. A process for making insulating material comprising the steps of:
(a) stabilizing an aqueous slurry of gypsum plaster with a polymeric, organic, hydrophilic compound;
(b) activating the stabilized slurry with a solution comprising a Lewis acid, and
(c) drying the hydrated gypsum product to yield an open-cell foam.

12. The process of claim 11 further comprising the step of employing the stabilized slurry to impregnate a substrate selected from the group consisting of a woven textile, a nonwoven sheet, a paper, a felt, or a sponge.

13. The process of claim 12, wherein the substrate comprises a material selected from the group consisting of wool, silk, cotton, linen, flax, ramie, cellulose, cellulose derivatives, regenerated cellulose, polyester, polyamide, polyamideimide, acrylic, acrylonitrile, polyvinyl chloride, polyurethane, hydrocarbon, polymer, graphite, nitride, asbestos, and mixtures and copolymers thereof.

14. The process of claim 12 further comprising the step of activating the impregnated substrate to cause the hydration of the gypsum.

15. The process of claim 12 further comprising the step of drying the impregnated substrate.

16. The process of claim 14 further comprising the step of drying the activated, impregnated substrate to produce an insulating sheet.

17. The process for producing open-cell, foamed gypsum comprising the step of mixing three streams comprising:
(a) a stabilized slurry of gypsum plaster, water, and polymeric stabilizer;
(b) an activator comprising Lewis acid, water, and a surface-active agent; and
(c) a foaming gas.

18. The process of claim 17 further comprising the step of drying the open-cell foamed gypsum.

19. The process of claim 17 further comprising the step of injecting the open-cell, foamed gypsum into an insulating cavity in building construction, whereby a concealed insulating layer is created upon drying.

20. The process of claim 17 further comprising the step of introducing the open-cell, foamed gypsum into a mold, whereby a shaped article is produced upon drying.

21. The process of claim 20, wherein the shaped article is a brick.

* * * * *